(12) United States Patent
Dworakowski et al.

(10) Patent No.: US 12,085,711 B2
(45) Date of Patent: Sep. 10, 2024

(54) HEATING DEVICE

(71) Applicant: Aptiv Technologies AG, Schaffhausen (CH)

(72) Inventors: Waldemar Dworakowski, Cracow (PL); Rafal Dlugosz, Poznan (PL)

(73) Assignee: Aptiv Technologies AG, Schaffhausen (CH)

( * ) Notice: Subject to any disclaimer, the term of this patent is extended or adjusted under 35 U.S.C. 154(b) by 11 days.

(21) Appl. No.: 18/305,274

(22) Filed: Apr. 21, 2023

(65) Prior Publication Data

US 2023/0258926 A1 Aug. 17, 2023

Related U.S. Application Data

(63) Continuation of application No. 16/713,104, filed on Dec. 13, 2019, now Pat. No. 11,693,234.

(30) Foreign Application Priority Data

Dec. 18, 2018 (EP) ..................................... 18213511

(51) Int. Cl.
*G02B 27/00* (2006.01)
*G02B 7/02* (2021.01)
(Continued)

(52) U.S. Cl.
CPC .......... *G02B 27/0006* (2013.01); *G02B 7/02* (2013.01); *H05B 6/06* (2013.01); *H05B 6/44* (2013.01)

(58) Field of Classification Search
CPC ...... G02B 27/0006; G02B 7/02; G02B 7/028; H05B 6/06; H05B 6/44; H05B 6/105; H05B 1/02; H05B 3/02; H05B 3/06; G03B 17/55
(Continued)

(56) References Cited

U.S. PATENT DOCUMENTS 3,058,840 A 10/1962 Kerr et al.
3,250,636 A 5/1966 Wilferth
(Continued)

FOREIGN PATENT DOCUMENTS

CA 2790428 A1 3/2013
CN 101553765 A 10/2009
(Continued)

OTHER PUBLICATIONS

"Interlocutory Decision in Opposition Proceedings", EP Application No. 18213511.1, May 26, 2023, 19 pages.
(Continued)

*Primary Examiner* — Tuyen Tra
*Assistant Examiner* — Rahman Abdur
(74) *Attorney, Agent, or Firm* — Harness, Dickey & Pierce, P.L.C.

(57) ABSTRACT

A heating device includes a housing, a primary induction coil, a controller circuit, and a secondary induction coil. The housing is configured to retain a camera lens. The primary induction coil is positioned proximate the housing and configured to generate a magnetic field in response to receiving electrical power from a power supply. The controller circuit is in electrical contact with the primary induction coil and is configured to control the electrical power delivered to the primary induction coil. The secondary induction coil overlays the primary induction coil and is configured to receive the magnetic field from the primary induction coil and generate heat. The secondary induction coil heats the camera lens when the primary induction coil receives the electrical power.

20 Claims, 5 Drawing Sheets

(51) Int. Cl.
  *H05B 6/06* (2006.01)
  *H05B 6/44* (2006.01)
(58) Field of Classification Search
  USPC .......................................................... 359/512
  See application file for complete search history.

(56) References Cited

U.S. PATENT DOCUMENTS

| | | |
|---|---|---|
| 2006/0035051 A1 | 2/2006 | Lhoest |
| 2006/0171704 A1 | 8/2006 | Bingle et al. |
| 2007/0023424 A1 | 2/2007 | Weber |
| 2007/0132318 A1 | 6/2007 | Schmidt et al. |
| 2008/0034528 A1 | 2/2008 | Bourke et al. |
| 2010/0016671 A1 | 1/2010 | Wieters et al. |
| 2010/0078427 A1 | 4/2010 | Haas et al. |
| 2012/0243093 A1 | 9/2012 | Tonar et al. |
| 2013/0032973 A1 | 2/2013 | Lucas et al. |
| 2014/0158680 A1 | 6/2014 | Kitaizumi et al. |
| 2014/0238978 A1 | 8/2014 | Kitaizumi et al. |
| 2015/0054350 A1* | 2/2015 | Covic ............... H01F 27/2871 242/360 |
| 2015/0160536 A1 | 6/2015 | Lang et al. |
| 2016/0091714 A1 | 3/2016 | Hui et al. |
| 2016/0134134 A1* | 5/2016 | Baarman ............... H02J 50/80 307/104 |
| 2016/0323952 A1* | 11/2016 | Li ....................... F21V 31/005 |
| 2018/0170314 A1 | 6/2018 | Paule et al. |
| 2018/0210161 A1 | 7/2018 | Park et al. |
| 2018/0283913 A1 | 10/2018 | Chen et al. |
| 2019/0006209 A1 | 1/2019 | Wieser et al. |
| 2019/0033579 A1 | 1/2019 | Ohsumi et al. |
| 2020/0189523 A1 | 6/2020 | Dworakowski et al. |
| 2020/0192085 A1 | 6/2020 | Dworakowski et al. |

FOREIGN PATENT DOCUMENTS

| | | |
|---|---|---|
| CN | 101766049 A | 6/2010 |
| CN | 102187273 A | 9/2011 |
| CN | 102736369 A | 10/2012 |
| CN | 102789115 A | 11/2012 |
| CN | 104618630 A | 5/2015 |
| CN | 104717410 A | 6/2015 |
| CN | 204405924 U | 6/2015 |
| CN | 106200214 A | 12/2016 |
| CN | 205901891 U | 1/2017 |
| CN | 206096730 U | 4/2017 |
| CN | 107942502 A | 4/2018 |
| CN | 207416705 U | 5/2018 |
| CN | 108535939 A | 9/2018 |
| CN | 108803201 A | 11/2018 |
| CN | 208175020 U | 11/2018 |
| DE | 102004057322 A1 | 6/2006 |
| DE | 102007004275 A1 | 7/2008 |
| EP | 3001674 A1 | 3/2016 |
| GB | 835161 A | 5/1960 |
| KR | 20150124197 A | 11/2015 |
| WO | 2018015856 A2 | 1/2018 |
| WO | 2018184892 A1 | 10/2018 |

OTHER PUBLICATIONS

"Extended European Search Report", EP Application No. 18213507.9, Jun. 19, 2019, 6 pages.
"Extended European Search Report", EP Application No. 18213511.1, Jun. 19, 2019, 6 pages.
"Foreign Office Action", CN Application No. 201911280305.1, Aug. 12, 2021, 15 pages.
"Foreign Office Action", CN Application No. 201911280725.X, Aug. 24, 2021, 16 pages.
"Notice of Opposition", EP Application No. 18213507.9, Apr. 7, 2022, 18 pages.
"Notice of Opposition", EP Application No. 18213511.1, Apr. 7, 2022, 12 pages.
"Summons to Attend Oral Proceedings", EP Application No. 18213507.9, Feb. 2, 2023, 20 pages.
"Summons to Attend Oral Proceedings", EP Application No. 18213511.1, Sep. 22, 2022, 10 pages.
Extended European Search Report for Application No. EP 18 21 3511 dated Jun. 19, 2019.

* cited by examiner

HEATING DEVICE

CROSS-REFERENCE TO RELATED APPLICATIONS

This application is a continuation of U.S. patent application Ser. No. 16/713,104, filed Dec. 13, 2019, which claims priority to European Patent Application No. 18213511.1, filed Dec. 18, 2018, the disclosures of which are hereby incorporated by reference in their entireties herein.

TECHNICAL FIELD

The present disclosure relates generally to a heating device that clears condensation from a camera lens.

BACKGROUND

Typical heating devices require electrical terminals and wiring attached to a windshield or cover-glass. United States Patent Application Publication Number 2006/0171704 A1 describes a heating element for heating a transparent camera lens cover that includes electrical terminals in contact with a surface of the transparent camera lens cover. Other applications describe a heating element positioned on a lens holder and resilient contacts used to heat a camera lens.

SUMMARY OF THE DISCLOSURE

The present disclosure proposes to solve the above mentioned problem by providing a heating device comprising a housing configured to retain a camera lens, a primary induction coil positioned proximate the housing and configured to generate a magnetic field in response to receiving electrical power from a power supply, a controller circuit in electrical contact with the primary induction coil configured to control the electrical power delivered to the primary induction coil, and a secondary induction coil overlaying the primary induction coil, the secondary induction coil configured to receive the magnetic field from the primary induction coil and generate heat. The secondary induction coil heats the camera lens when the primary induction coil receives the electrical power.

According to other features of the present disclosure:
the primary induction coil surrounds an optical axis of the camera lens;
the secondary induction coil is interposed between the primary induction coil and the housing;
the secondary induction coil is in direct contact with the housing;
the secondary induction coil is located on an outer surface of the housing;
the secondary induction coil is located on an inner surface of the housing;
the secondary induction coil is in direct contact with the camera lens;
the controller circuit includes a low-Q resonant circuit in electrical communication with the primary induction coil;
the secondary induction coil is comprised of a first layer of resistive material and a second layer of low-Curie point ferrite;
the secondary induction coil is formed of a conductive material having a greater electrical resistance relative to the primary induction coil;
adjoining segments are formed of materials having a different electrical conductivity from one another;
a distance between the primary induction coil and the secondary induction coil is in a range from 0.0 mm to 10.0 mm;
a number of windings on the primary induction coil is at least one;
a number of windings on the secondary induction coil is at least one;
the secondary induction coil has a thickness in a range from 1 µm to 1000 µm;
the secondary induction coil has a width in a range from 0.1 mm to 5 cm.

BRIEF DESCRIPTION OF THE DRAWINGS

The present disclosure is now described by way of example with reference to the accompanying drawings in which.

DESCRIPTION OF THE EMBODIMENTS

Figure 1:
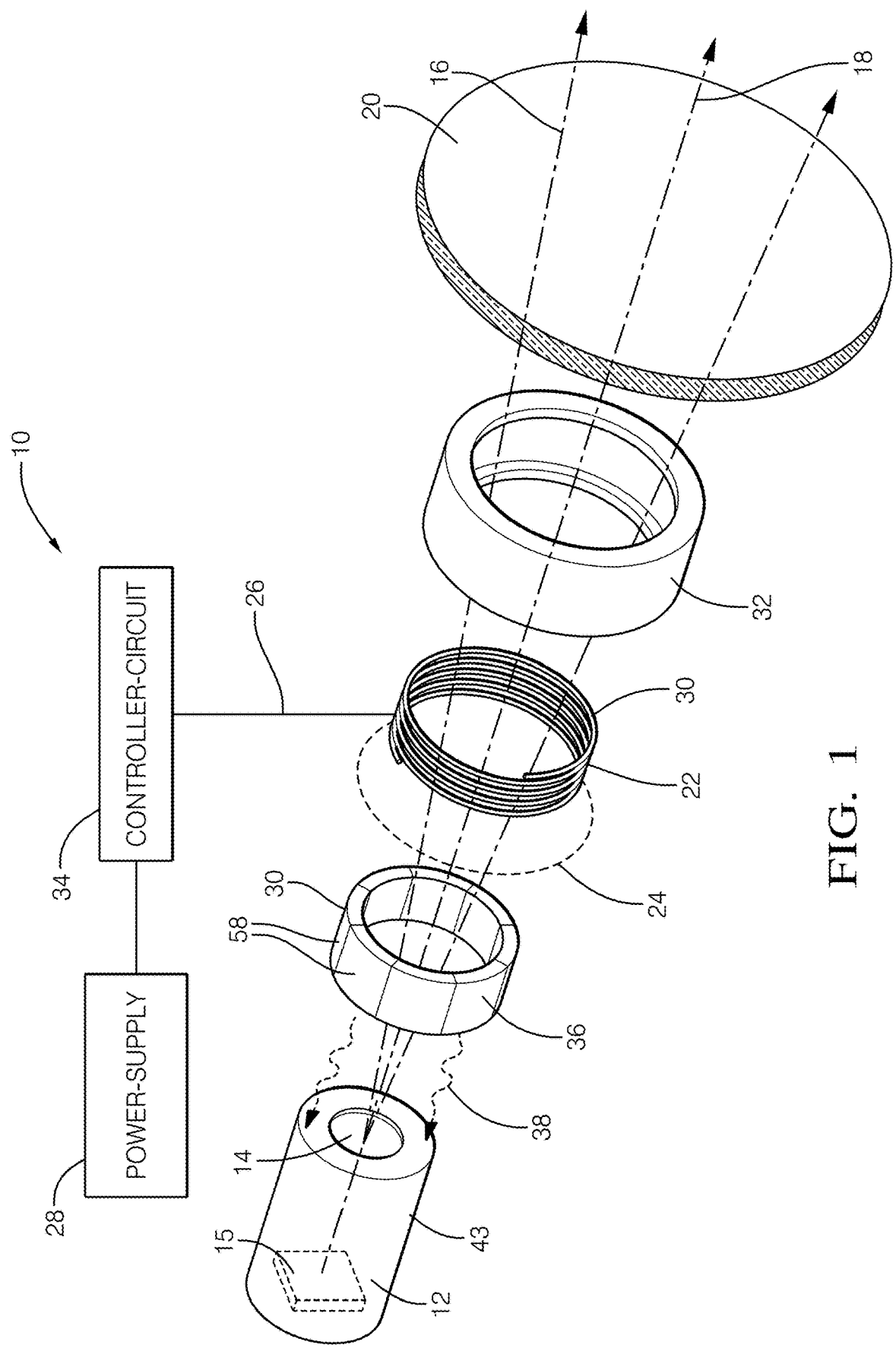
FIG. 1 is an exploded perspective view of a heating device according to an embodiment of the disclosure.

Hereinafter, a heating device 10 for a camera lens 14 according to an embodiment of the present disclosure will be described with reference to the figures. FIG. 1 is an exploded perspective view illustrating the heating device 10, hereafter referred to as the device 10. The device 10 includes a housing 12 configured to retain the camera lens 14. The housing 12 may be formed of any material, such as a polymeric material, a ceramic, or a metal. Preferably, the housing 12 is formed of a dielectric material, such as the polymeric material, or the ceramic material. That is, the housing 12 preferably would not have electrically conductive properties, which has the technical benefit of lower thermal resistance and lower electrical losses. The housing 12 may have a circular cross section or may have any other cross section, such as a rectilinear cross section. The housing 12 may include an imager 15 used to render an image of a surrounding area. The camera lens 14 defines a field-of-view 16 and an optical axis 18 as illustrated in FIG. 1. The housing 12 may be mounted on a front of a vehicle, on sides of a vehicle, on a rear of a vehicle, or mounted in the interior of the vehicle at a location suitable for the camera to view the area around the vehicle through the windshield 20. In the examples illustrated herein, the housing 12 is mounted inside the vehicle with the view through the windshield 20.

The device 10 also includes a primary induction coil 22 positioned proximate the housing 12 and is configured to generate a magnetic field 24 in response to receiving electrical power 26 from a power supply 28. The power supply 28 may be a direct-current (DC) power supply 28, or may be an alternating-current (AC) power supply 28. In the examples illustrated herein the power supply 28 is an AC power supply 28. The primary induction coil 22 surrounds the optical axis 18 of the camera lens 14 and may also surround a portion of the housing 12. A number of windings 30 (e.g., wires, conductive traces, etc.) on the primary induction coil 22 is at least one, and are preferably wound onto a ferromagnetic core 32 (e.g. iron, ferrites, etc.). In the example illustrated in FIG. 1, the ferromagnetic core 32 encircles the primary induction coil 22. It will be appreciated that the number of windings 30 will increase with the increasing size of the area required to be heated. It will also be appreciated that the ferromagnetic core 32 may be omitted (i.e., an air core coil) depending on packaging and weight constraints. A single winding 30 (i.e. a single wire) of the primary induction coil 22 may be any diameter, and in the examples illustrated herein, preferably has the diameter in a range from 0.2 mm to 1.0 mm. The windings 30 may be formed of any electrically conductive material, such as copper alloys or aluminum alloys, and may include a dielectric layer on a surface of the windings 30.

The device 10 also includes a controller circuit 34 in electrical contact with the primary induction coil 22. The power supply 28 may be separate or integral to the controller circuit 34, and in the examples illustrated herein, the power supply 28 is integral to the controller circuit 34. The controller circuit 34 is configured to control the electrical power 26 delivered to the primary induction coil 22. The controller circuit 34 may include a processor (not shown) such as a microprocessor or other control circuitry such as analog and/or digital control circuitry including an application specific integrated circuit (ASIC) for processing data as should be evident to those in the art. The controller circuit 34 may include a memory (not shown), including non-volatile memory, such as electrically erasable programmable read-only memory (EEPROM) for storing one or more routines, thresholds, and captured data. The one or more routines may be executed by the processor to perform steps for determining the electrical power 26 delivered to the primary induction coil 22 based on signals received by the controller circuit 34 from the primary induction coil 22, as described herein.

The device 10 also includes a secondary induction coil 36 overlaying the primary induction coil 22. That is, the secondary induction coil 36 is encircled by the primary induction coil 22. The secondary induction coil 36 is configured to receive the magnetic field 24 from the primary induction coil 22, thereby generating heat 38. The magnetic field 24 from the primary induction coil 22 induces an electrical current in the secondary induction coil 36. The induced electrical current in the secondary induction coil 36 causes the secondary induction coil 36 to increase in temperature because the secondary induction coil 36 is formed of a material that has an electrical resistance. The electrical resistance of the secondary induction coil 36 resists the flow of electrical current within the secondary induction coil 36, which generates the heat 38 (also known as Joule heating or Ohmic heating). It will be appreciated that no wire connections exist between the primary induction coil 22 and the secondary induction coil 36. This has the technical benefit of reducing a size and complexity of the overall assembly.

The secondary induction coil 36 also surrounds the optical axis 18 and, in the example illustrated in FIG. 1, is both interposed between the primary induction coil 22 and the housing 12, and is in direct contact with an outer surface 43 of the housing 12. In an embodiment, the secondary induction coil 36 is located on an inner surface 42 of the housing 12 and is in direct contact with an outer-diameter of the camera lens 14 (see FIG. 5).

The secondary induction coil 36 heats the camera lens 14 and the housing 12, and removes condensation (e.g., fog, ice, etc.) when the primary induction coil 22 receives the electrical power 26 from the controller circuit 34. A heating rate and a maximum temperature is controlled to inhibit a thermal shock to the housing 12 and/or camera lens 14, and also to prevent an unsafe surface temperature for human contact.

Figure 2:
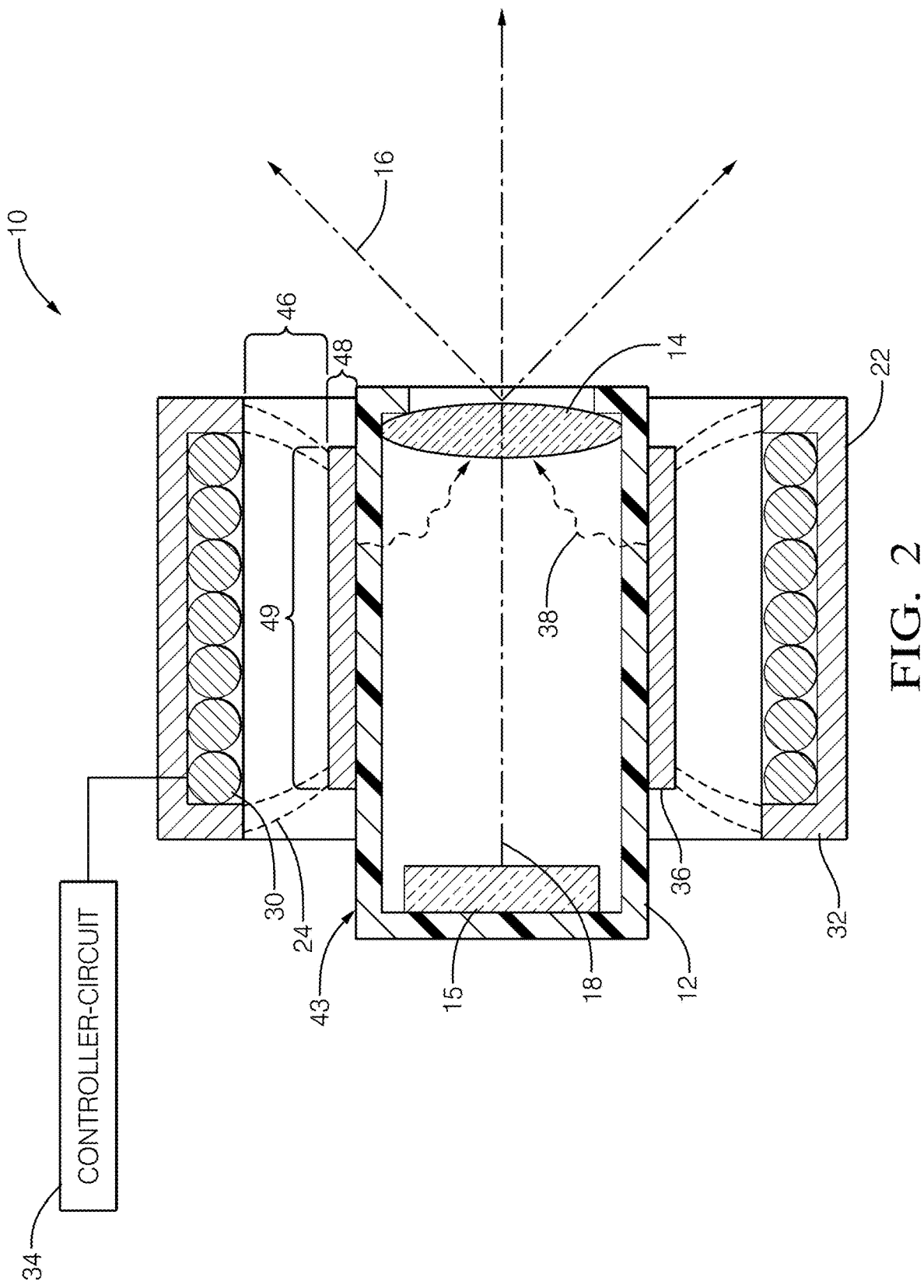
FIG. 2 is a section view of the heating device of FIG. 1.

FIG. 2 is a section view of the device 10 and illustrates the embodiment where the secondary induction coil 36 is located on the outer surface 43 of the housing 12. A distance 46 between the primary induction coil 22 and the secondary induction coil 36 is preferably in a range from 0.0 mm to about 10.0 mm. The distance 46 primarily impacts a coupling of the primary induction coil 22 and the secondary induction coil 36. The secondary induction coil 36 has a width 49 preferably in a range from about 0.1 mm to about 5 cm. It will be appreciated that the width 49 of the secondary induction coil 36 affects the heat transfer to the housing 12 and camera lens 14. The width 49 may be user defined depending on a desired heating profile for the housing 12 and/or camera lens 14.

The number of windings 30 on the secondary induction coil 36 is at least one, and may be increased to achieve a specific temperature profile applied to the housing 12. The windings 30 on the secondary induction coil 36 may be a single flat winding 30 that may be deposited using a thick-film ink, for example. The secondary induction coil 36 as illustrated in FIG. 2 has a thickness 48 in the range from about 1 μm to about 1000 μm. The thickness 48 may be adjusted based on the type of material comprising the secondary induction coil 36, and based on a frequency 50 of the electrical power 26 delivered to the primary induction coil 22. In an embodiment, the secondary induction coil 36 has a thickness 48 of 400 μm and is formed of a material with a low relative magnetic permeability (e.g., silver, aluminum, etc.). In another embodiment, the secondary induction coil 36 is formed of a material having higher magnetic permeability (e.g., iron) having a thickness 48 of 15 μm. The thickness 48 may also be reduced by increasing the frequency 50 of the of the electrical power 26 delivered to the primary induction coil 22.

Figure 3:
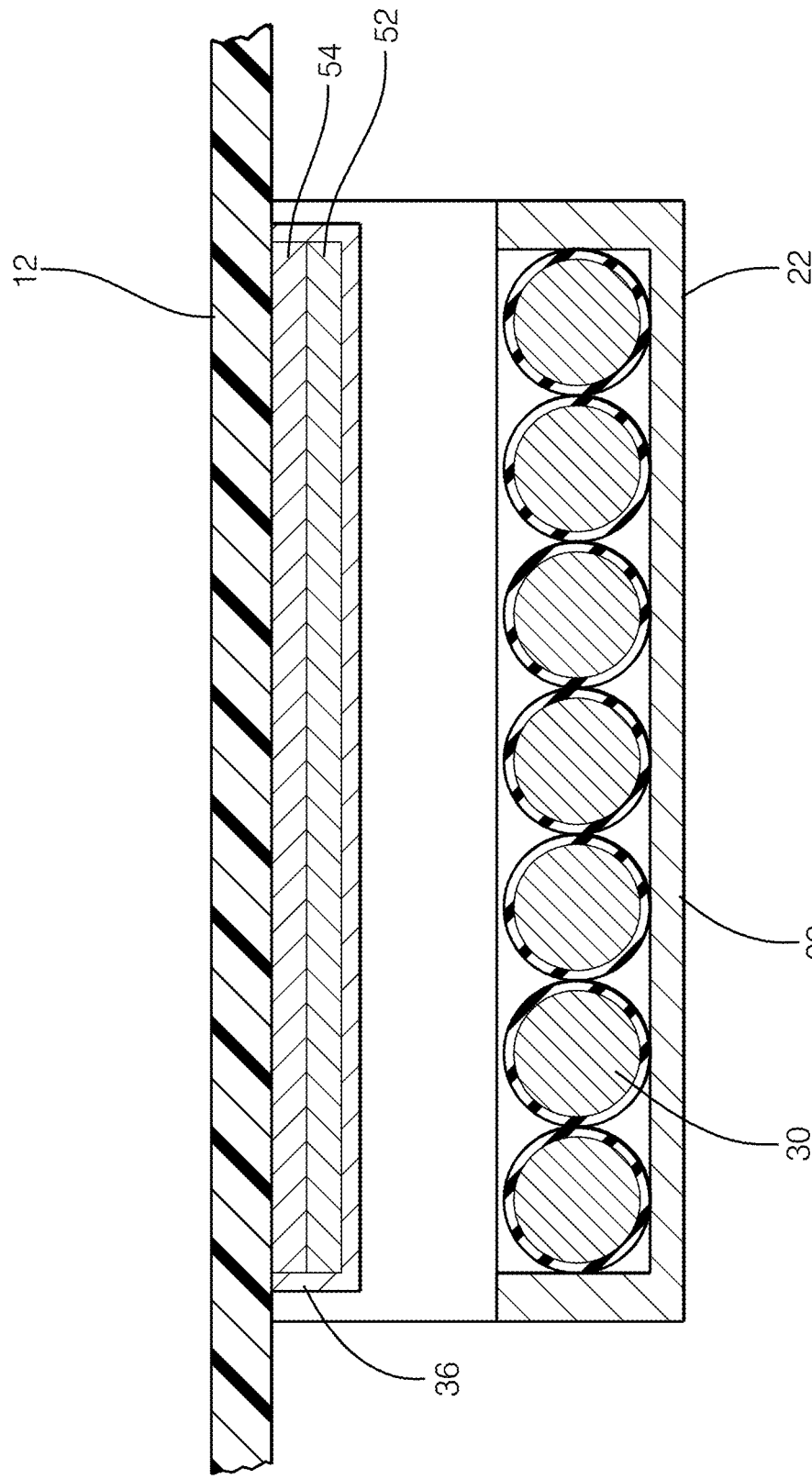
FIG. 3 is a section view of a portion of the heating device of FIG. 2.

FIG. 3 is a magnified view of a portion of the device 10 of FIG. 2. The secondary induction coil 36 is preferably comprised of a first layer 52 of resistive material that dissipates the power transmitted by the magnetic field 24, and a second layer 54 of low-Curie point ferrite. When the secondary induction coil 36 reaches a Curie point temperature (e.g. approximately 90 degrees Celsius for a Mn—Zn ferrite at 8 μm-9 μm thickness 48), a magnetic permeability of the second layer 54 is decreased, thereby reducing the induced heating of the secondary induction coil 36. This reduction of the induced heating of the secondary induction coil 36 changes a resonant frequency of a control circuit 56, the benefit of which will be described in more detail below. Preferably, the secondary induction coil 36 is formed of a conductive material having a greater electrical resistance than that of the primary induction coil 22. The first layer 52 and the second layer 54 may also have a protective coating (not specifically shown) applied to their exposed surfaces to improve a durability of the layers.

Referring back to FIG. 1, the secondary induction coil 36 may be characterized as segmented 58, wherein adjoining segments 58 are formed of materials having a different electrical conductivity from one another. That is, a first-segment may have a relatively low electrical resistance thereby emitting a relatively low quantity of heat 38, wherein a second-segment in contact with the first-segment may have a higher electrical resistance compared to the first-segment, thereby emitting a larger quantity of heat 38 than the first-segment. This segmentation 58 has the technical benefit of enabling a specific heating profile on the housing 12 and/or on the camera lens 14. For example, preferentially heating corners of a rectangular housing 12 where the corners are a greater length away from the optical axis 18 compared to a side of the rectangular housing 12 that may be closer to the optical axis 18. It will be appreciated that other patterns of segmentation 58 are possible based on a geometry of the housing 12 and/or a geometry of the camera lens 14.

Figure 4:
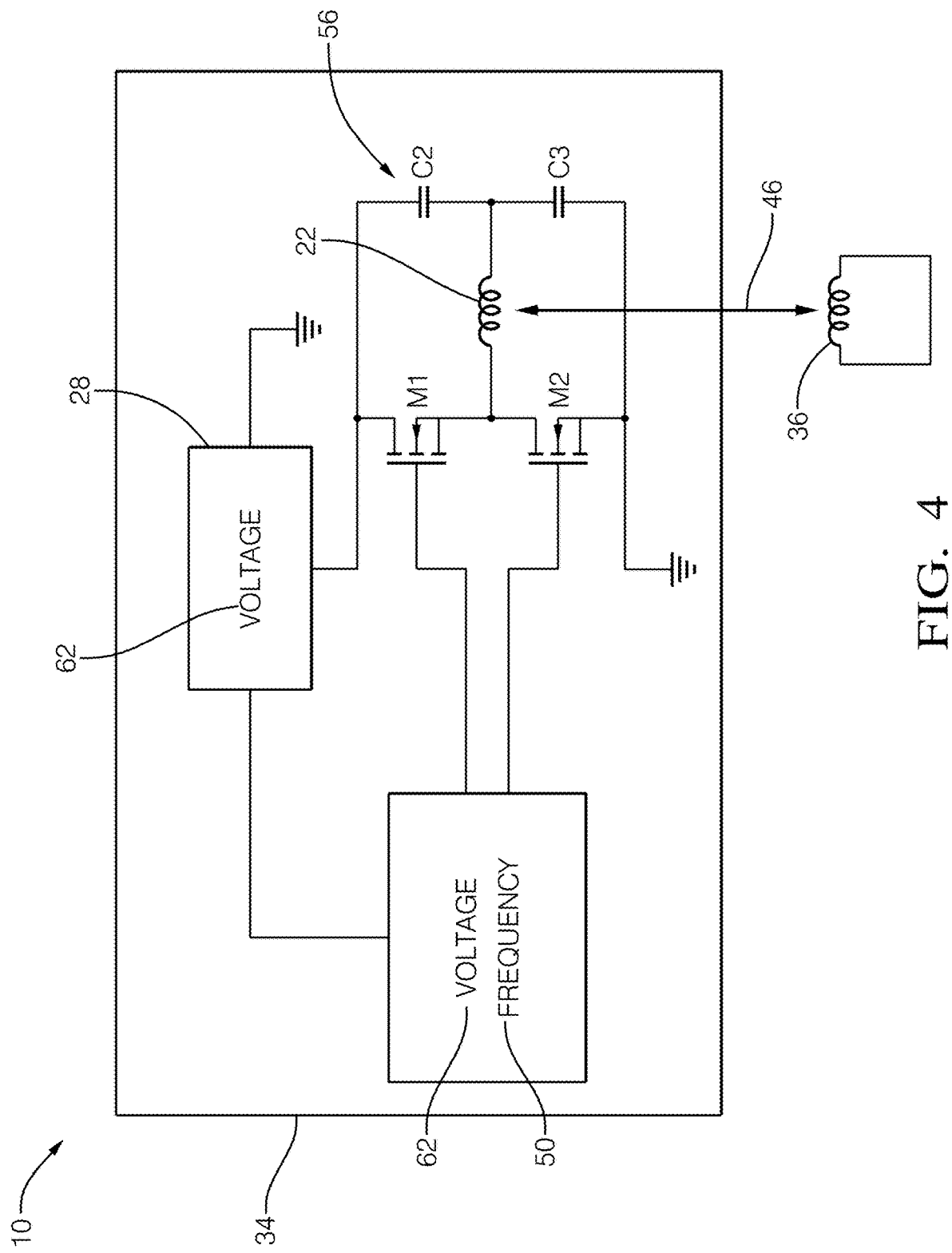
FIG. 4 is a schematic of the heating device of FIG. 1 illustrating a controller circuit.

FIG. 4 is a schematic diagram of the device 10 illustrating the controller circuit 34. The controller circuit 34 preferably includes a low-Q resonant control circuit 56 in electrical communication with the primary induction coil 22. A Q-factor (i.e., quality factor) of an electronic circuit is a parameter that describes the resonance behavior of a harmonic oscillator or resonator. The low-Q factor is indicative of an overdamped system that does not resonate or oscillate. The low-Q resonant control circuit 56 has the technical benefit of improved temperature control in the secondary induction coil 36. It will be appreciated that the values of capacitors C1 and C2 (not specifically shown) may be selected to achieve the desired resonant frequency to drive the secondary induction coil 36 and produce the desired heat 38. The temperature of the secondary induction coil 36 may be controlled by adjusting a voltage 62 applied to, and/or adjusting the frequency 50 of a signal delivered to, the primary induction coil 22 through the MOSFETs M1 and M2 (not specifically shown) and through the power supply 28. The controller circuit 34 is configured to monitor an impedance of the primary induction coil 22, which is directly related to the temperature of the secondary induction coil 36, and controls the voltage 62 and/or frequency 50 (e.g. 40 kHz) to maintain proper operation of the control circuit 56. This method of temperature measurement has the technical benefit of eliminating a separate temperature sensor mounted to the windshield 20.

Figure 5:
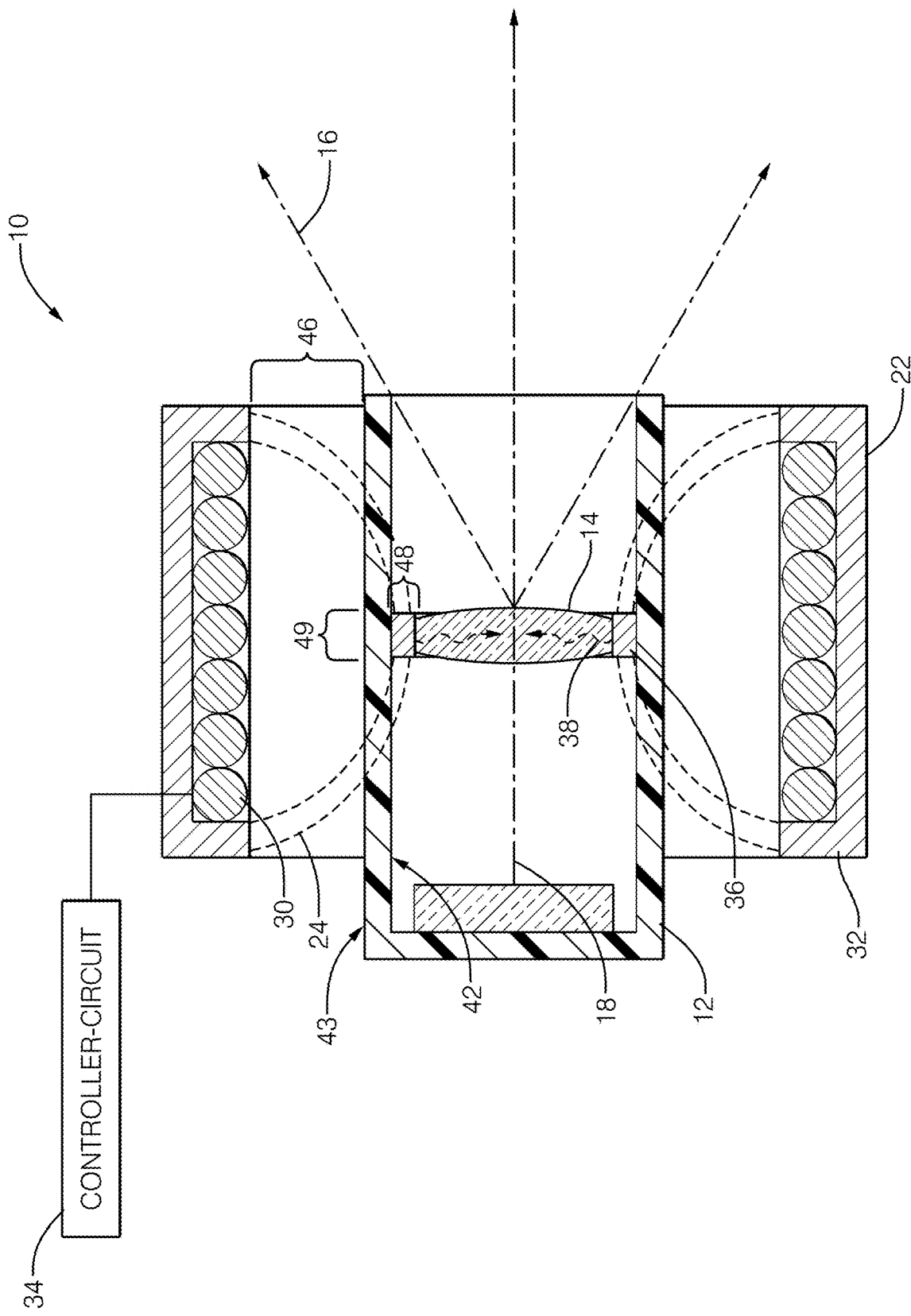
FIG. 5 is a section view of the heating device of FIG. 1 in accordance with another embodiment.

FIG. 5 is a section view of another embodiment where the secondary induction coil 36 surrounds the outer diameter of the camera lens 14. The secondary induction coil 36 is also in direct contact with the camera lens 14 and has the technical benefit of conductive heat transfer directly to the camera lens 14. In the example illustrated in FIG. 5, the secondary induction coil 36 is located on the inner surface 42 of the housing 12. It will be appreciated that the dielectric properties of the housing 12 enable the embodiment illustrated in FIG. 5 and will not interfere with the coupling of the primary induction coil 22 and the secondary induction coil 36. It will also be appreciated that the secondary induction coil 36 of the embodiment of FIG. 5 is not limited to locations internal to the housing 12. That is, the housing 12 may be partitioned by the secondary induction coil 36, with a first section of the housing 12 terminating at a first-side of the secondary induction coil 36 and a second section of the housing 12 extending from a second side of the secondary induction coil 36. In this arrangement, the secondary induction coil 36 may be flush with the outer surface 43 of the housing 12.

What is claimed is:

1. A heating device comprising:
    a housing configured to retain a camera lens;
    a primary induction coil positioned proximate the housing and configured generate a magnetic field in response to receiving electrical power from a power supply;
    a controller circuit in electrical contact with the primary induction coil and configured to control the electrical power delivered to the primary induction coil; and
    a secondary induction coil configured to receive the magnetic field from the primary induction coil and generate heat to heat the camera lens, at least a portion of the secondary induction coil being encircled by the primary induction coil.

2. The heating device of claim 1, wherein the primary induction coil surrounds an optical axis of the camera lens.

3. The heating device of claim 1, wherein the secondary induction coil is positioned between the primary induction coil and the housing.

4. The heating device of claim 3, wherein the secondary induction coil is in direct contact with the housing.

5. The heating device of claim 3, wherein the secondary induction coil is located on an outer surface of the housing.

6. The heating device of claim 1, wherein the secondary induction coil is in direct contact with the camera lens.

7. The heating device of claim 1, wherein the controller circuit includes a low-Q resonant circuit in electrical communication with the primary induction coil.

8. The heating device of claim 1, wherein the secondary induction coil is comprised of a first layer of resistive material and a second layer of low-Curie point ferrite.

9. The heating device of claim 1, wherein the secondary induction coil is formed of a conductive material having a greater electrical resistance than a material of the primary induction coil.

10. The heating device of claim 1, wherein the secondary induction coil is segmented and adjoining segments are formed of materials having a different electrical conductivity from one another.

11. The heating device of claim 1, wherein a distance between the primary induction coil and the secondary induction coil is in a range from 0.0 mm to 10.0 mm.

12. The heating device of claim 1, wherein a number of windings on the primary induction coil is at least one.

13. The heating device of claim 1, wherein a number of windings on the secondary induction coil is at least one.

14. The heating device of claim 1, wherein the secondary induction coil has a thickness in a range from 1.0 μm to 1000 μm.

15. The heating device of claim 1, wherein the secondary induction coil has a width in a range from 0.1 mm to 5 cm.

16. The heating device of claim 1, wherein windings of the primary induction coil are wound onto a ferromagnetic core.

17. The heating device of claim 16, wherein the ferromagnetic core is made of iron or ferrites.

18. The heating device of claim 16, wherein the ferromagnetic core encircles the primary induction coil.

19. The heating device of claim 1, wherein the controller circuit is further configured to adjust a temperature of the secondary induction coil by adjusting a voltage applied to the primary induction coil.

20. The heating device of claim 1, wherein the controller circuit is further configured to adjust a temperature of the secondary induction coil by adjusting a frequency of the electrical power delivered to the primary induction coil.

* * * * *